(12) United States Patent
Xie et al.

(10) Patent No.: US 9,991,667 B2
(45) Date of Patent: Jun. 5, 2018

(54) METHOD FOR GENERATING FEMTOSECOND VORTEX BEAMS WITH HIGH SPATIAL INTENSITY CONTRAST

(71) Applicant: Shanghai Jiao Tong University, Shanghai (CN)

(72) Inventors: Guoqiang Xie, Shanghai (CN); Liejia Qian, Shanghai (CN); Zhen Qiao, Shanghai (CN); Lingchen Kong, Shanghai (CN); Zhipeng Qin, Shanghai (CN); Peng Yuan, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days. days.

(21) Appl. No.: 15/481,390

(22) Filed: Apr. 6, 2017

(65) Prior Publication Data

US 2017/0310071 A1    Oct. 26, 2017

(30) Foreign Application Priority Data

Apr. 21, 2016  (CN) .......................... 2016 1 0251666

(51) Int. Cl.
| | |
|---|---|
| *H01S 3/11* | (2006.01) |
| *H01S 3/094* | (2006.01) |
| *H01S 3/081* | (2006.01) |
| *H01S 3/00* | (2006.01) |
| *H01S 3/08* | (2006.01) |
| *H01S 3/16* | (2006.01) |

(52) U.S. Cl.
CPC .......... *H01S 3/1115* (2013.01); *H01S 3/0014* (2013.01); *H01S 3/08004* (2013.01); *H01S 3/0815* (2013.01); *H01S 3/08059* (2013.01); *H01S 3/094* (2013.01); *H01S 3/163* (2013.01); *H01S 3/1616* (2013.01)

(58) Field of Classification Search
CPC ...... H01S 3/1115; H01S 3/163; H01S 3/1616; H01S 3/08059; H01S 3/0014; H01S 3/0815; H01S 3/094; H01S 3/08004
See application file for complete search history.

(56) References Cited

U.S. PATENT DOCUMENTS

| | | | | |
|---|---|---|---|---|
| 2012/0307247 | A1* | 12/2012 | Tan .................... | G01N 21/6458 356/445 |
| 2013/0089119 | A1* | 4/2013 | Kopf ....................... | H01S 3/08 372/69 |
| 2015/0063390 | A1* | 3/2015 | Hamilton ............... | H01S 3/086 372/45.01 |

* cited by examiner

*Primary Examiner* — Xinning Niu
(74) *Attorney, Agent, or Firm* — Mei & Mark LLP; Manni Li

(57) ABSTRACT

A method for generating femtosecond vortex beams with high spatial intensity contrast, where a noncollinearly pumped HG beam femtosecond laser generates femtosecond HG beam and a cylindrical lens mode converter converts the femtosecond HG beam to femtosecond LG vortex beam. The HG beam femtosecond laser comprises a pump source, a gain medium, a saturable absorption mirror as modelocker, and an output coupler with a noncollinear angle between the laser beam and the pump beam in the gain medium, which enables the laser to generate pure, order-tunable femtosecond HG beams. Femtosecond vortex beams obtained after the cylindrical lens converter have high-intensity-contrast, and are topological charge-tunable.

2 Claims, 5 Drawing Sheets

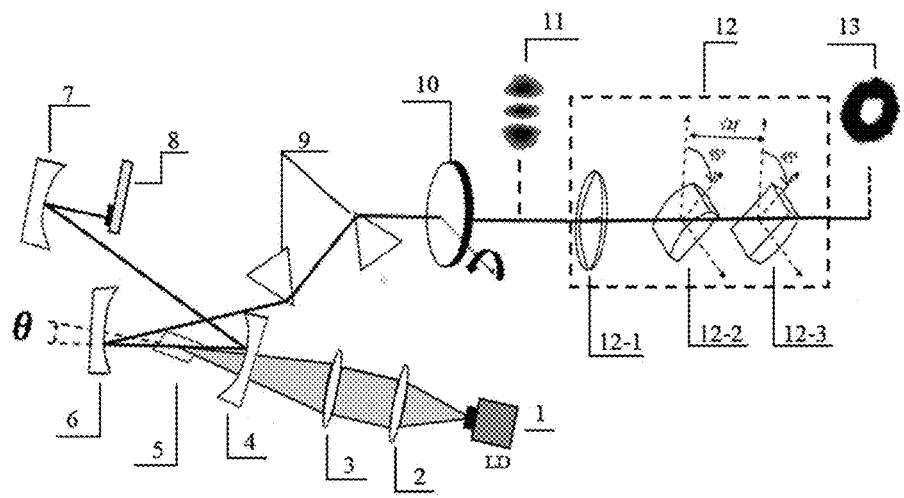
Figure 1
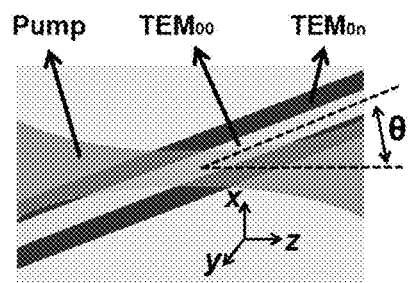
Figure 2(a)
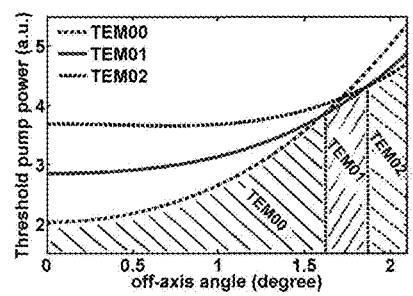
Figure 2(b)
Figure 2

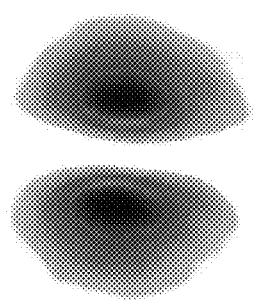
Figure 3(a)
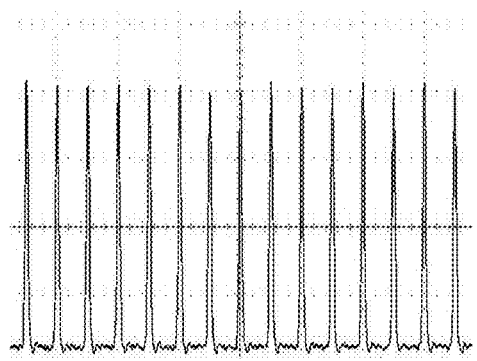
Figure 3(b)
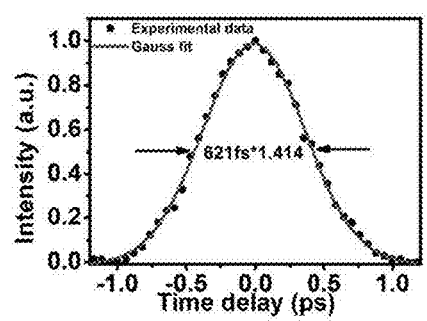
Figure 3(c)
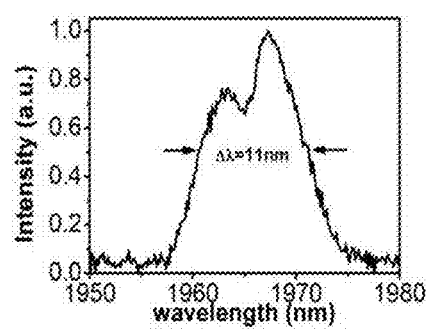
Figure 3(d)
Figure 3

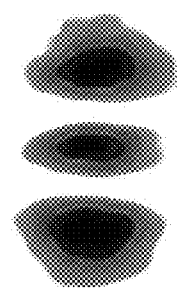
Figure 4(a)
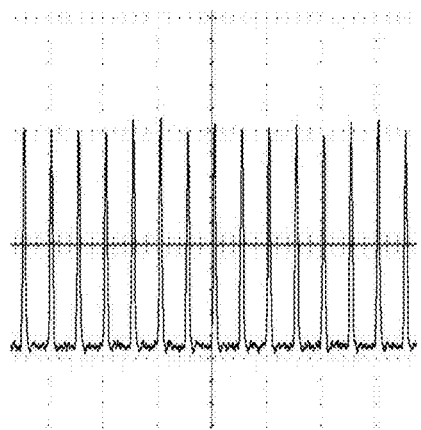
Figure 4(b)
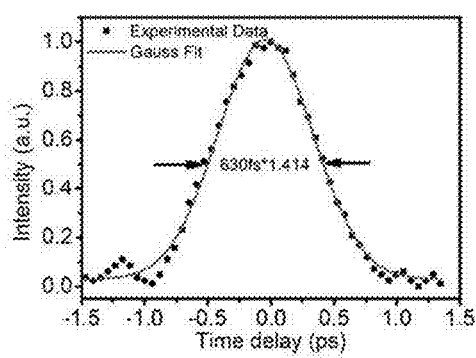
Figure 4(c)
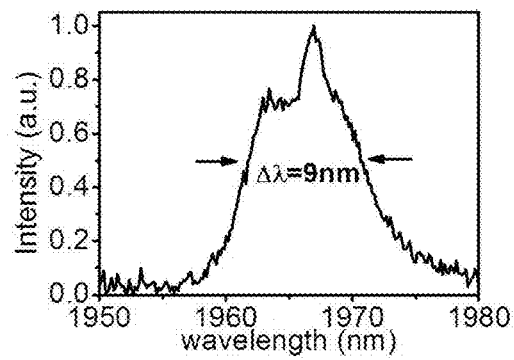
Figure 4(d)
Figure 4

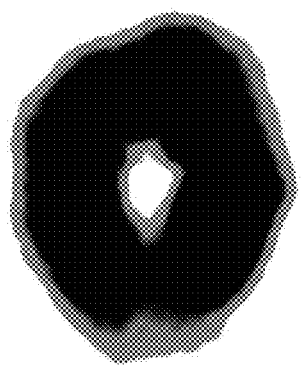
Figure 5(a)
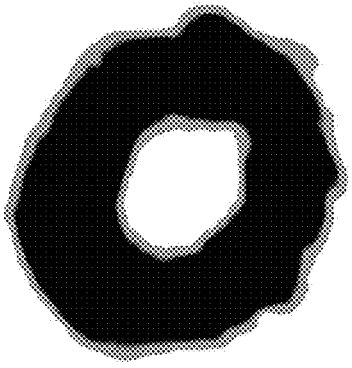
Figure 5(b)
Figure 5(c)
Figure 5(d)
Figure 5

METHOD FOR GENERATING FEMTOSECOND VORTEX BEAMS WITH HIGH SPATIAL INTENSITY CONTRAST

CROSS-REFERENCE AND RELATED APPLICATION

The subject application claims priority on Chinese patent application No. 201610251666.3 filed on Apr. 21, 2016. The Chinese priority application is incorporated herein by reference.

FIELD OF THE INVENTION

The present invention relates to laser technology, particularly, method for generating high-spatial-contrast femtosecond vortex beams.

BACKGROUND OF THE INVENTION

Femtosecond optical vortices, combining the spatial characteristics of the helical phase and the annular beam with femtosecond time duration, may open up a variety of fascinating applications, ranging from femtosecond micro-nano manipulation to vortex strong-field physics. Each photon in a vortex beam carries an orbit angular momentum of lh, where l is the topological charge number.

The traditional phase- or diffraction element-based (spiral phase plate, hologram grating, etc.) vortex generation techniques are only suitable for CW and picosecond lasers with a narrow spectral bandwidth, where the effect of dispersion may be ignored. As femtosecond vortex has wide spectral bandwidth, the traditional phase- or diffraction element-based vortex generation techniques are intrinsically limited by dispersion, which will result in unclean femtosecond vortex generation. With the traditional vortex generation techniques, the central node of the femtosecond vortex is not clean. In other words, the femtosecond vortex has a low spatial intensity contrast. Meanwhile, high spatial intensity contrast is of great importance for the femtosecond vortex application, especially in the strong-field physics field.

SUMMARY OF THE INVENTION

To overcome the deficiencies of the current technology, the present invention provides a method for generating femtosecond vortex beams with high spatial intensity contrast. High-order femtosecond HG beams are generated directly from a noncollinearly pumped mode-locked laser, then the femtosecond HG beams are converted into femtosecond LG beams, i.e., femtosecond vortices, by a cylindrical lens mode converter. Since the noncollinearly pumped laser may generate a clean single HG mode, and the cylindrical lens converter may perfectly convert a single HG mode to an ideal vortex, the femtosecond vortex generated with the method of the present invention is inherently clean and distinctly different from the traditional phase element-based conversion techniques using a Gaussian beam.

The method of the present invention for generating femtosecond vortex beams with high spatial intensity contrast comprises the following steps:

(1) Build a noncollinearly-pumped laser. The laser comprises a pump source, two coupling lenses, a gain medium, three concave mirrors, a saturable absorption mirror (SAM), and an output coupler (OC). First, align the laser cavity to generate a laser beam from the OC, and monitor the patterns of the output laser beam with a CCD camera. Then, rotate the output coupler to form a special angle θ between the laser beam and the pump beam in the gain medium so that the high-order Hermite-Gaussian beam is generated from the output coupler. The angle θ determines which order of $HG_{0n}$ beam has the lowest threshold pump power and thus is selected to oscillate, and here n=0, 1, 2, 3 .... Optimize the SAM position to obtain stable mode-locking, and generate a high-order femtosecond Hermite-Gaussian beam from the OC.

(2) Build a cylindrical lens mode converter to convert HG modes into Laguerre-Gaussian (LG) vortex modes. The cylindrical lens mode converter comprises a lens and two identical cylindrical lenses. The cylindrical lens mode converter is aligned, and the output beam patterns from the mode converter is monitored with a CCD camera until it presents the pattern of the femtosecond $LG_{0n}$ mode beam, which demonstrates that the femtosecond HG beam has been converted into the femtosecond LG beam, that is, the femtosecond vortex beam.

The threshold pump power of the $HG_{0n}$ beam depends on the noncollinear angle θ between the laser beam and the pump beam in the gain medium, which may be given in the following formula. Given that for the θ angle, only the special-order $HG_{0n}$ beam having the lowest threshold pump power $[P_{th}(HG_{0n})]$ is selected to oscillate in the laser.

$$P_{th}(HG_{0n}) = \frac{\gamma I_{sat}}{2\alpha\eta_p} \frac{\pi 2^{2n} n!(1-e^{-\alpha L})}{\int_{-L/2}^{L/2} Q[w_l, w_x(z), w_y(z), \theta]\exp\left[-\frac{2z^2\sin^2\theta}{w_l^2 + w_x^2(z)\cos^2\theta} - \alpha(z+L/2)\right]dz}$$

where $$Q[w_l, w_x(z), w_y(z), \theta] = \sum_{k=0}^{n} \frac{2^k k!}{\sqrt{[w_l^2 + w_x^2(z)\cos^2\theta][w_l^2 + w_y^2(z)]}} \left[\frac{2w_x^2(z)}{w_l^2\cos^2\theta + w_x^2(z)\cos^4\theta}\right]^k \cdot$$

$$\left\{\sum_{j=0}^{[(n-k)/2]} \binom{n}{k+2j} \frac{(k+2j)!}{k!j!} \left[\frac{w_x^2(z)(2-\cos^4\theta) - w_l^2\cos^2\theta}{w_x^2(z)\cos^4\theta + w_l^2\cos^2\theta}\right]^j H_{n-k-2j}\left[\frac{-2zw_l\sin\theta}{w_x^2(z)\cos^4\theta + w_l^2\cos^2\theta}\right]\right\}^2$$

Here, $P_{th}(HG_{0n})$ is the threshold pump power for the $HG_{0n}$ beam oscillation; $H_{n-k-2j}$ is the Hermite polynomial; $w_l$ is the radius of fundamental-mode Gaussian beam which may be calculated by the ABCD matrix; $w_x(z)$ and $w_y(z)$ are the spot radii of the pump beam in the gain medium in the vertical and horizontal directions, respectively, which may be directly measured; L is the length of the gain medium; α is absorption coefficient of the gain medium at the pump wavelength, which is calculated by $-1/L*Ln(P/P_0)$, here $P_0$ is the incident pump power and P is the residual pump power after the crystal. $\eta_p$, $\gamma$, and $I_{sat}$ are the pumping efficiency, total logarithmic loss per pass, and saturation intensity, respectively.

The laser comprises a pump source, the first lens, the second lens, the first concave mirror, the second concave mirror, a gain medium placed in the center of the first concave mirror and the second concave mirror, the third concave mirror, a saturable absorption mirror (SAM), a pair of prisms, and an output coupler.

The pump light emitted from the pump source is collimated and focused into the gain medium through the first lens and the second lens. The laser beam is generated in the gain medium and is focused onto the SAM after reflection by the first concave mirror and the third one; then, it returns to the gain medium with the same path after being reflected by the SAM. Then, the laser beam is reflected by the second concave mirror, and then, passes through the pair of prisms. Finally, the laser beam reaches the output coupler and outputs from the output coupler. The laser beam being generated is a femtosecond HG beam while noncollinearly pumping. A noncollinear angle θ exists between the laser beam and the pump beam in the gain medium by rotating the OC.

The cylindrical lens mode converter comprises a round lens, the first cylindrical lens, and the second cylindrical lens that is identical to the first cylindrical lens. The first and second cylindrical lenses are positioned so that the axes of the two cylindrical lenses has a 45 degree angle relative to the horizontal level, and the distance between them is √2f, where f is the focal length of the cylindrical lenses. The round lens focuses the HG beam to the center of the two cylindrical lenses. The convex surface of the first cylindrical lens and the plano surface of the second cylindrical lens face the laser incident direction.

Compared with previous techniques, the benefits of the present invention include:

(1) The noncollinearly pumped femtosecond mode-locked laser generates a pure HG beam, and the cylindrical lens mode converter perfectly converts the pure femtosecond HG beam into the femtosecond LG vortex beam, thus the generated femtosecond LG vortex is clean and high-spatial-contrast.

(2) The SAM, used as the mode locker, makes the femtosecond mode-locked laser robust and long-term stable, which benefits the practical applications for femtosecond vortex beams.

(3) By rotating the OC, the order of the femtosecond HG beams is adjusted and controlled, therefore, the topological charges of the generated femtosecond vortex beams are also adjustable and controllable. The method of the present invention is simple and robust.

BRIEF DESCRIPTION OF DRAWINGS

FIG. 1 shows the femtosecond vortex mode-locked laser in one embodiment of the present invention.

FIG. 2 shows the generation of high-order HG beams and the controllable-order principle, among which, FIG. 2(a) shows the spatial overlap of the pump beam, the fundamental mode beam, and the nth-order HG beam in the gain medium; FIG. 2(b) shows the normalized threshold pump powers of various $HG_{0,n}$ modes versus the noncollinear angle between the pump beam and the laser beam as FIG. 2(a) depicts.

FIG. 3 shows the mode-locking results of the $HG_{01}$ beam, among which, FIG. 3(a) shows the pattern of the $HG_{01}$ beam; FIG. 3(b) shows the pulse train in ns scale; FIG. 3(c) shows the autocorrelation trace of the mode-locked pulses showing a 621-fs pulse duration with Gaussian fit; and FIG. 3(d) shows the optical spectrum of the mode-locked pulses.

FIG. 4 shows the mode-locking results of the $HG_{02}$ beam, among which, FIG. 4(a) shows the pattern of the $HG_{02}$ beam; FIG. 4(b) shows the pulse train in ns scale; FIG. 4(c) shows the autocorrelation trace of the mode-locked pulses showing a 630-fs pulse duration with Gaussian fit; FIG. 4(d) shows the optical spectrum of the mode-locked pulses.

FIG. 5 shows the patterns of the femtosecond LG beams (femtosecond vortex beams) converted by the cylindrical lens mode converter and the interferograms of the LG beams interfering with plane waves, among which, FIG. 5(a) and FIG. 5(b) are the patterns of the $LG_{01}$ beam and the $LG_{02}$ beam, respectively; FIG. 5(c) shows the interferogram of the $LG_{01}$ beam interfering with a plane wave, where there presents one fork in the center, showing single topological charge; FIG. 5(d) shows the interferogram of the $LG_{02}$ beam interfering with a plane wave, where there present two forks in the center, showing double topological charges.

Figure 6:
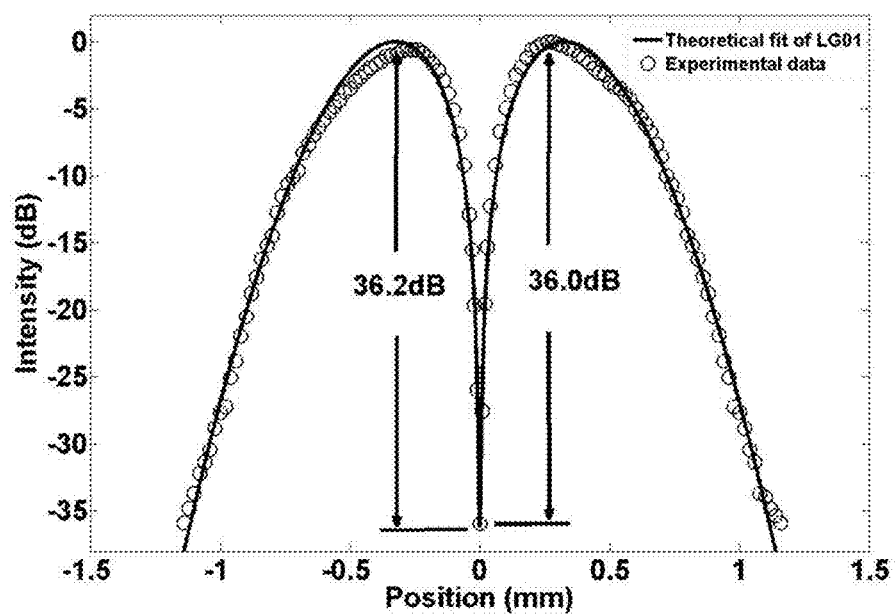
FIG. 6 shows the spatial intensity contrast measurement result of the femtosecond $LG_{01}$ vortex beam, and the spatial intensity contrast is 36 dB for $LG_{01}$ beam.

Reference numbers in the Figures refer to the following structure;

1—laser diode (pump source); 2—the first lens; 3—the second lens; 4—the first concave mirror; 5—the gain medium; 6—the second concave mirror; 7—the third concave mirror; 8—the SAM; 9—the pair of prisms; 10—the output coupler; 11—the pattern of the femtosecond $HG_{01}$ mode beam (as recorded by a CCD camera); 12—the cylindrical lens mode converter; 12-1—the round lens; 12-2—the first cylindrical lens; 12-3—the second cylindrical lens; 13—the pattern of the femtosecond $LG_{02}$ beam (as recorded by a CCD camera).

DETAILED DESCRIPTION OF THE INVENTION AND PREFERRED EMBODIMENTS

The present invention is described in further details with reference to the accompanying figures.

By rotating the output coupler, a noncollinear angle θ between the laser beam and the pump beam in the gain medium arises. For any θ angle, there exists a $HG_{0,n}$ beam with the lowest threshold pump power (FIG. 2) and is selected to oscillate, here n is an integer. By passive mode locking with a SAM, a pure femtosecond $HG_{0,n}$ beam is generated from the output coupler, then it is converted into the corresponding femtosecond $LG_{0l}$ beam by a cylindrical lens mode converter, here l is also an integer and equals n. The $LG_{0l}$ beam is a vortex beam with a topological charge of l, and each photon of the $LG_{0l}$ beam carries an orbit angular momentum of lh.

The laser system is built as shown in FIG. 1, where the pump source 1 is a single-emitter LD emitting the pump light at the wavelength of 793 nm. By a couple of lenses, the pump beam is then collimated and focused into the center of the gain medium 5, a Tm: CYA crystal, whose radiation wavelength is 1970 nm. Here, the two lenses have the same focal length of 100 mm. The first, second, and third concave mirrors 4, 6, and 7, the SAM 8, and the output coupler 10 compose the five-mirror laser cavity system, where the three concave mirrors have the same curvature radius of −100 mm, and the SAM is a semiconductor saturable absorber mirror (SESAM)(BATOP, SAM-1960-8-10ps-x). The gain medium 5 is positioned at the center between the first concave mirror 4 and the second one 6 that have a distance of 110 mm. The beam propagation path in the cavity is: after generation from the gain medium 5, the laser beam is reflected by the first concave mirror 4 and the third one 7 and focused onto the SAM 8, where the distance between the two concave mirrors is 600 mm and that between the third concave mirror 7 and the SAM 8 is 50 mm. By reflection of the SAM 8, the laser beam returns to the gain medium 5 with the same path. Then, it passes through the pair of prisms after reflected by the second concave mirror 6, where the distance between the prisms is 350 mm. Finally, the laser beam reaches the output coupler 10 and outputs from the output coupler. The length of the light path between the third concave mirror 6 and the output coupler 10 is 700 mm.

First, the laser cavity is aligned to generate a laser beam from the OC, and the patterns of the output laser beam is monitored with a CCD camera. The output coupler is rotated until the pattern of the $HG_{01}$ beam arises on the CCD screen as shown in FIG. 3(a). Then, the position of the SAM is optimized to obtain stable mode-locking, then it generates a femtosecond $HG_{01}$ beam from the OC, and the mode-locked pulses are shown in FIG. 3(b).

The cylindrical lens mode converter 12 is shown in FIG. 1. A lens 12-1 with a focal length of 160 mm is used to focus the femtosecond HG beam to the center between the two identical cylindrical lenses with a focal length of 50 mm. The two cylindrical lenses are positioned at 45° with respect to the horizontal plane with a distance of 70.7 mm, and the convex surface of the first cylindrical lens and the plano surface of the second cylindrical lens face the laser incident direction. After passing through the two cylindrical lenses, the femtosecond $HG_{01}$ beam is converted into the femtosecond $LG_{01}$ beam, that is, the femtosecond vortex beam with a single topological charge. The pulse duration is 621 fs, as shown in FIG. 3(c), and the spatial intensity contrast is 36 dB as shown in FIG. 6(a). The spatial intensity contrast of the femtosecond vortex beam generated with the method of the present invention has increased 1-2 orders of magnitude compared to those generated with traditional methods.

The output coupler is further rotated until the pattern of the femtosecond $HG_{02}$ beam arises on the CCD screen as shown in FIG. 4(a), whose mode-locked pulse train is shown in FIG. 4(b). Then, the cylindrical lens mode converter is used to convert the femtosecond $HG_{02}$ beam into femtosecond $LG_{02}$ beam, i.e., the femtosecond vortex beam with double topological charge. The duration of the pulse is 630 fs as shown in FIG. 4(c).

When certain noncollinear angle θ (>0.85°) exists between the laser beam and the pump beam in the gain medium, a high-order $HG_{0,n}$ beam has a better spatial overlap with the pump beam compared to the fundamental-mode Gaussian beam and has a lower threshold pump power for oscillation. For any θ angle, a $HG_{0,n}$ beam exists with the lowest threshold pump power, as shown in FIG. 2, and is selected to oscillate. The relationship between the threshold pump power for the $HG_{0,n}$ mode oscillation and the noncollinear angle θ is:

$$P_{th}(HG_{0n}) = \frac{\gamma I_{sat}}{2\alpha \eta_p} \frac{\pi 2^{2n} n!(1-e^{-\alpha L})}{\int_{-L/2}^{L/2} Q[w_l, w_x(z), w_y(z), \theta] \exp\left[-\frac{2z^2\sin^2\theta}{w_l^2 + w_x^2(z)\cos^2\theta} - \alpha(z+L/2)\right]dz}$$

where $$Q[w_l, w_x(z), w_y(z), \theta] = \sum_{k=0}^{n} \frac{2^k k!}{\sqrt{[w_l^2 + w_x^2(z)\cos^2\theta][w_l^2 + w_y^2(z)]}} \left[\frac{2w_x^2(z)}{w_l^2\cos^2\theta + w_x^2(z)\cos^4\theta}\right]^k \cdot$$

$$\left\{\sum_{j=0}^{[(n-k)/2]} \binom{n}{k+2j}\frac{(k+2j)!}{k!j!}\left[\frac{w_x^2(z)(2-\cos^4\theta) - w_l^2\cos^2\theta}{w_x^2(z)\cos^4\theta + w_l^2\cos^2\theta}\right]^j H_{n-k-2j}\left[\frac{-2zw_l\sin\theta}{w_x^2(z)\cos^4\theta + w_l^2\cos^2\theta}\right]\right\}^2$$

Here, $P_{th}(HG_{0n})$ is the threshold pump power for the $HG_{0n}$ beam oscillation; $H_{n-k-2j}$ is the Hermite polynomial; $w_l$ is the radius of the corresponding fundamental-mode Gaussian beam; $w_x(z)$ and $w_y(z)$ are the spot radii of the pump beam in the vertical and horizontal directions, respectively; L is the length of the gain medium; α is absorption coefficient of the gain medium at the pump wavelength; $\eta_p$, γ, and $I_{sat}$ are the pumping efficiency, the total logarithmic loss per pass and the saturation intensity, respectively. According to the above formula, the normalized threshold pump powers of $HG_{0n}$ beams (n=0, 1, 2) versus noncollinear angle θ are calculated, as shown in FIG. 2(b), with the parameters of $w_l=w_x=w_y=35$ μm, L=6 mm and α=0.8 $mm^{-1}$ (Other parameters are normalized and do not affect the results). As shown in FIG. 2(b), when the noncollinear angle increases to 0.85 degree, the $HG_{01}$ beam has the lowest threshold pump power, so it is selected to oscillate; when the noncollinear angle increases to 1.12 degree, the $HG_{02}$ beam has the lowest threshold pump power and is selected to oscillate. The order of the femtosecond $HG_{0,n}$ beams may be adjusted and controlled by rotating the output coupler, so that the topological charges of the femtosecond LG beams are adjustable and controllable.

The present invention provides a method to generate clean femtosecond vortex beams from laser with high spatial intensity contrast, which solves the problem with the low-spatial-intensity-contrast for femtosecond vortices generated with traditional methods. Moreover, the method enables the topological charges adjustable and controllable.

Finally, the above embodiment merely illustrates the technical solution of the present invention and is not meant to limit the scope of the invention. Although the present invention has been described in details with reference to the preferred embodiments, it should be understood by the ordinary technicians in the field that the technical solution of the present invention may be modified or equivalently replaced without departing from the sprit and the scope of the technical solutions contained in the claims of the present invention.

We claim:

1. A method for generating femtosecond vortex beams with high spatial intensity contrast, comprising:

building a noncollinearly-pumped laser, said noncollinearly pumped laser comprising a pump source for emitting a pump beam, a gain medium, three concave mirrors, a saturable absorption mirror (SAM), and an output coupler, aligning the laser cavity to generate a laser beam from the output coupler, monitoring pattern of the output laser beam with a CCD camera, rotating the output coupler to form a noncollinear angle $\theta$ between the laser beam and the pump beam in the gain medium so that the high-order Hermite-Gaussian beam is generated from the output coupler; the noncollinear angle $\theta$ determines an order of $HG_{0n}$ beam having a lowest threshold pump power and being selected to oscillate, and n is 0 or an integer, optimizing position of the SAM to obtain stable mode-locking, and generating a high-order femtosecond Hermite-Gaussian beam from the output coupler, building a cylindrical lens mode converter to convert the high-order femtosecond Hermite-Gaussian beam into a femtosecond Laguerre-Gaussian vortex beam, and aligning the cylindrical lens mode converter until a pattern of femtosecond $LG_{0n}$ beam is obtained on the CCD screen;

wherein relationship of the threshold pump power for $HG_{0,n}$ beam oscillation and the noncollinear angle $\theta$ between the laser beam and the pump beam in the gain medium satisfies that, for the noncollinear angle $\theta$, the order of $HG_{0,n}$ beam with the lowest threshold pump power ($P_{th}$ ($HG_{0n}$)) is selected to oscillate in the noncollinearly-pumped laser as follows:

2. $P_{th}(HG_{0n}) = \dfrac{\gamma I_{sat}}{2\alpha\eta_p} \dfrac{\pi 2^{2n} n! (1 - e^{-\alpha L})}{\int_{-L/2}^{L/2} Q[w_l, w_x(z), w_y(z), \theta] \exp\left[-\dfrac{2z^2 \sin^2\theta}{w_l^2 + w_x^2(z)\cos^2\theta} - \alpha(z + L/2)\right] dz}$ 3. Wherein 4. $Q[w_l, w_x(z), w_y(z), \theta] =$ $\sum_{k=0}^{n} \dfrac{2^k k!}{\sqrt{[w_l^2 + w_x^2(z)\cos^2\theta][w_l^2 + w_y^2(z)]}} \left[\dfrac{2w_x^2(z)}{w_l^2\cos^2\theta + w_x^2(z)\cos^4\theta}\right]^k *$ -continued $\left\{ \sum_{j=0}^{[(n-k)/2]} \binom{n}{k+2j} \dfrac{(k+2j)!}{k!j!} \left[\dfrac{w_x^2(z)(2-\cos^4\theta) - w_l^2\cos^2\theta}{w_x^2(z)\cos^4\theta + w_l^2\cos^2\theta}\right]^j \right.$ $\left. H_{n-k-2j}\left[\dfrac{-2zw_l\sin\theta}{w_x^2(z)\cos^4\theta + w_l^2\cos^2\theta}\right] \right\}^2$ 5. $P_{th}$ ($HG_{0n}$) is a threshold pump power for an $HG_{0n}$ beam oscillation; $H_{n-k-2j}$ is a Hermite polynomial; $w_l$ is a radius of a fundamental-mode Gaussian beam; $w_x(z)$ and $w_y(z)$ are spot radii of the pump beam in vertical and horizontal directions, respectively;

L is the length of the gain medium; $\alpha$ is the absorption coefficient of the gain medium at the pump wavelength; $\eta_p$ is the pumping efficiency; $\gamma$ is the total logarithmic loss per pass; and $I_{sat}$ is the saturation intensity.

2. The method of claim 1, wherein the laser further comprises a first lens, a second lens, the first concave mirror, the second concave mirror, the third concave mirror, and a pair of prisms, wherein the gain medium is placed at the center between the first concave mirror and the second concave mirror, a pump beam emitted from the pump source is collimated and focused into the gain medium through the first lens and the second lens, the laser beam is generated from the gain medium and then is focused onto the saturable absorber mirror after being reflected by the first concave mirror and the third concave mirror, the laser beam returns to the gain medium with the same path after being reflected by the saturable absorption mirror, After being reflected by the second concave mirror, the laser beam passes through the pair of prisms, and a femtosecond Hermite-Gaussian beam outputs through the output coupler.

\* \* \* \* \*